United States Patent
Schoening

(10) Patent No.: US 10,391,857 B2
(45) Date of Patent: Aug. 27, 2019

(54) ANGLED LOUVERED GRILL COVER ASSEMBLY FOR VEHICLES

(71) Applicant: HBPO GmbH, Lippstadt (DE)

(72) Inventor: Ralf Schoening, Herzebrock-Clarholz (DE)

(73) Assignee: HBPO GMBH (DE)

( * ) Notice: Subject to any disclaimer, the term of this patent is extended or adjusted under 35 U.S.C. 154(b) by 14 days.

(21) Appl. No.: 15/533,274

(22) PCT Filed: Dec. 3, 2015

(86) PCT No.: PCT/EP2015/078480
§ 371 (c)(1),
(2) Date: Jun. 5, 2017

(87) PCT Pub. No.: WO2016/087567
PCT Pub. Date: Jun. 9, 2016

(65) Prior Publication Data
US 2017/0326970 A1 Nov. 16, 2017

(30) Foreign Application Priority Data
Dec. 3, 2014 (DE) .................. 10 2014 117 816

(51) Int. Cl.
*B60K 11/00* (2006.01)
*B60K 11/08* (2006.01)
*B60K 11/04* (2006.01)

(52) U.S. Cl.
CPC ............ *B60K 11/085* (2013.01); *B60K 11/04* (2013.01); *Y02T 10/88* (2013.01)

(58) Field of Classification Search
CPC ....... B60K 11/085; B60K 11/04; B60K 11/08; Y02T 10/88; F01P 7/10
See application file for complete search history.

(56) References Cited

U.S. PATENT DOCUMENTS

| | | | | |
|---|---|---|---|---|
| 4,926,921 A | * | 5/1990 | Heinemann | .......... B60K 11/085 160/115 |
| 2011/0073395 A1 | * | 3/2011 | Lee | ..................... B60K 11/085 180/68.1 |
| 2011/0247779 A1 | | 10/2011 | Charnesky | |
| 2012/0012410 A1 | | 1/2012 | Hori | |

(Continued)

FOREIGN PATENT DOCUMENTS

| GB | 2512071 | 9/2014 |
|---|---|---|
| KR | 20120113956 | 10/2012 |

OTHER PUBLICATIONS

PCT Search Report dated Apr. 26, 2016 for PCT/EP2015/078480 filed on Dec. 3, 2015 entitled Optimized Air Control System for Vehicles.

*Primary Examiner* — Travis C Ruby
(74) *Attorney, Agent, or Firm* — Fish IP Law, LLP

(57) ABSTRACT

A system and method for regulating an airstream to a radiator device of a vehicle. The device guides the airstream through at least one opening toward the radiator device, and includes at least two cover elements that at least partially close the at least one opening while in a closed position. The device includes a drive that moves the cover elements between the closed position and an open position such that the at least one opening is at least partially open. A driver coupled to the drive and cover elements transfers the movement from the drive to the elements.

12 Claims, 8 Drawing Sheets

(56) References Cited

U.S. PATENT DOCUMENTS

2012/0019025 A1     1/2012   Evans
2013/0264133 A1    10/2013   Remy
2014/0273806 A1     9/2014   Frayer
2014/0284123 A1*   9/2014   Bourqui ............... B60K 11/085
                                                                       180/68.1

* cited by examiner

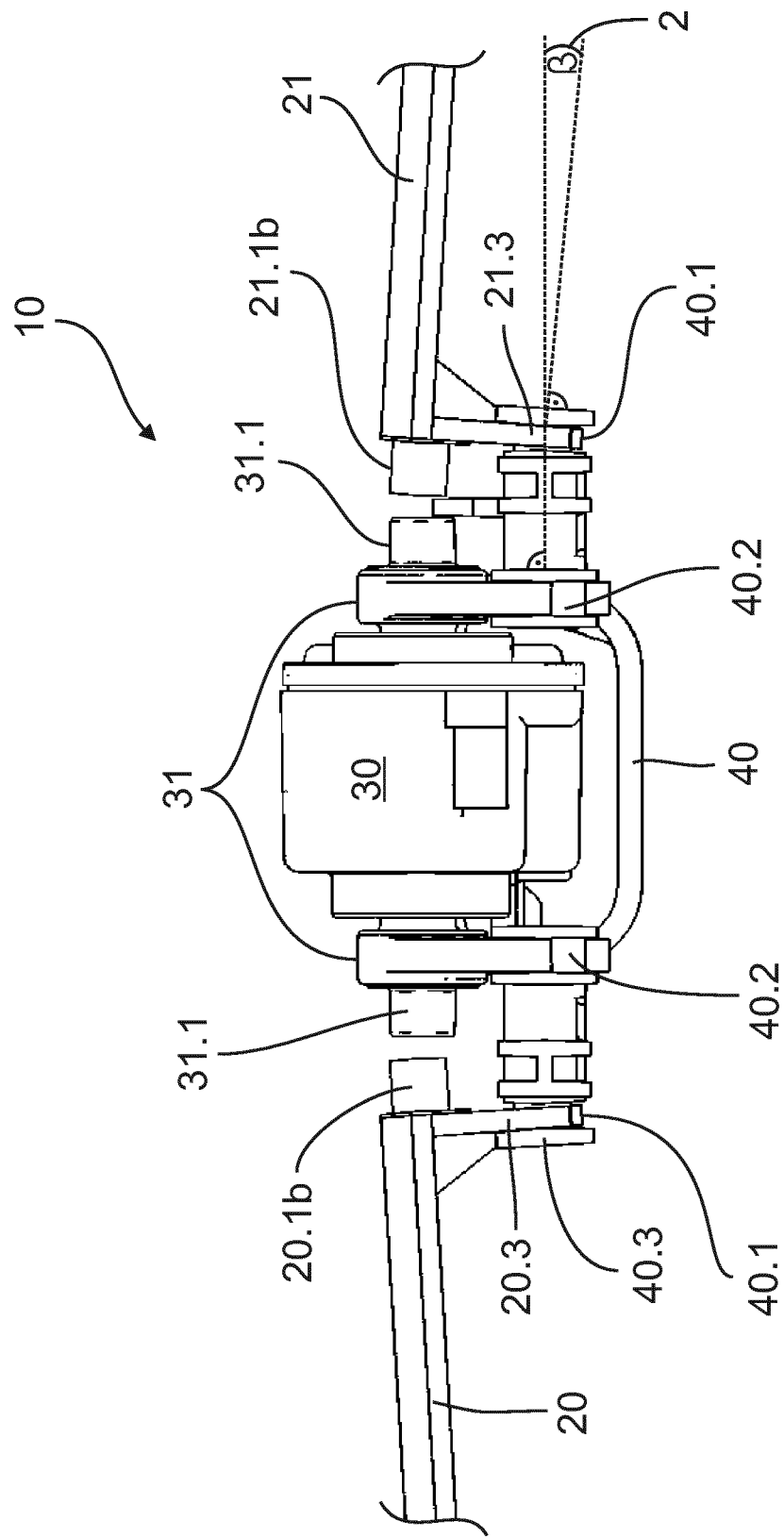

ANGLED LOUVERED GRILL COVER ASSEMBLY FOR VEHICLES

FIELD OF THE INVENTION

The invention relates to a device for controlling an airstream flowing to a radiator device of a vehicle.

BACKGROUND

It is known from the state of the art that in vehicles, particularly motor vehicles, fresh air enters the motor vehicle by slits, like for example a radiator grill, and the airstream is guided to a radiator device of the vehicle. Hereby it can be ensured that for example an engine of the vehicle is efficiently and reliably cooled and/or the vehicle interior is efficiently air-conditioned. Thereby, a device for the regulation of the air stream can be used in order to at least partially close the slits of the vehicle using cover elements and therewith to at least partially prevent the entry of air. This affects that for example an air cushion in front of the radiator grill is reduced which reduces the cold run stage of the engine and the operating temperature of the engine can be reached faster. Therewith, the carbon dioxide output of the vehicle is reduced and the cw-value (air drag coefficient of the vehicle) is optimized.

Disadvantageously, with the known solutions for said devices for regulating the airstream is that according to the construction they often comprise an increased space requirement particularly in longitudinal direction of the vehicle and therewith can only be arranged in a significant distance to the slits (for example of the radiator grill in the vehicle). Due to the distance an air cushion can result with the entry of air which negatively affects the air resistance of the vehicle. As a further disadvantage it has turned out that such devices often comprise a geometry according to the construction which cannot be adapted to the geometry of the vehicle (for example the construction space of the vehicle). Therewith, often only a difficult mounting in the vehicle is possible. An adjustment of the geometry of the device is further only performable with an increased effort during the production of the device.

It is, therefore, object of the present invention to at least partially avoid the previously described disadvantages. Particularly, it is object of the present invention to enable a reliable and efficient radiator and regulation of the airstream of vehicles, wherein the space requirements of the device are reduced and an adjustment to the geometry of the vehicle is possible with a low effort.

SUMMARY OF THE INVENTION

The previous object is solved by a device and method of the inventive subject matter discussed herein. Further features and details of the invention result from the respective dependent claims, the description and the drawings. Thereby, features and details which are described in relation to the device according to the invention naturally also apply in connection with the method according to the invention and vice versa such that according to the disclosure of the single aspects of the invention it can always be reciprocally related to.

The device according to the invention, particularly radiator air regulation device, serves for regulating an airstream to a radiator device of a vehicle, particularly motor vehicle, wherein the airstream is guidable to the cooler device through at least one slit with at least two cover elements for at least partially closing the slits in at least a closed position and a drive particularly, an engine (preferable an electric rotation motor) for moving the cover elements between the closed position and an open position for at least a partial clearing of the slit, wherein one, particularly only one single, driver for the transfer of the movement of the (common) drive to the cover elements is provided, wherein the cover elements are arranged angled towards one another, particularly in axial direction. The axial direction relates to a longitudinal or tilting or rotating movement of the cover elements and corresponds particularly mainly to the normal or perpendicular towards the driving direction. The (particularly neighbouring) cover elements are thereby particularly deflected or angled in respect to the normal of the drive direction and/or always, meaning in the open and also in the closed position (and in between), angled with a constant angle α towards one another. Therewith the advantage can be achieved that the device according to the invention can be optimally adapted to the geometry of the motor vehicle (particularly the frontal side of the motor vehicle and/or the front module of the vehicle and/or the aerodynamic of the motor vehicle) and therewith less construction space is necessary. Hereby a simple mounting of the device according to the invention is possible and an adapted sealing of the slit in the closed position by the (particularly neighbouring and/or angled) cover elements can occur. This further permits an improved carbon dioxide reduction and an improved optimization of the cw-value of the vehicle.

Thereby, the device according to the invention, particularly a cool air-regulation device, serves particularly for radiator an engine and/or for air-conditioning of the vehicle. With the vehicle it can for example be a motor vehicle preferably, a passenger vehicle and/or a commercial vehicle. For regulating the airstream at least two (assembled laterally towards one another) cover elements are intended, particularly a first and a second cover element, wherein preferably first cover elements on a first (for example left) side in the vehicle and second cover elements are arranged on the opposing side (for example right) side in the motor vehicle. Particularly, all first cover elements comprise the same horizontal or axial orientation. The direction information thereby always relate to the vehicle direction with the mounted device. Thus, for example the front side of the device according to the invention in drive direction and the rear side are adjusted to the vehicle interior.

It is further possible that at each side of the device according to the invention one, two, three and/or four or more cover elements are intended respectively, wherein the cover elements are arranged on each side (meaning first and second cover elements) preferably parallel to one another and/or one below the other. It is for example a plurality of first cover elements intended, which are arranged in parallel and a plurality of second cover elements, which are arranged in parallel, wherein all first and second cover elements, particularly in the same manner and/or at the same time, are moved in the open and closed position, particularly by the driver, in order to particularly completely close the slits in the closed position. The slit is for example an opening for fresh air at the frontal side of the vehicle, for example a radiator grill, and can preferably comprise the area in front of the device according to the invention and/or multiple slit areas in the device according to the invention through which air can be guided through the device according to the invention, for example between the cover elements and the open position of the cover elements. Thereby the slit is at least partially (up to completely) released by the cover elements in the open position and in the closed position the slits are at least partially closed by the cover elements up to completely and thus the air entry is at least partially prevented.

For the movement or adjustment of the cover elements between the closed position and the open position it is necessary that the cover elements can be moved particularly at the same time. Herefore, a driver for the transfer of the (drive) movement, particularly a rotating movement and/or a turning movement, of the (particularly single) drive is intended, in order to transfer the movement from the drive particularly evenly and/or in the same manner to the cover elements, particularly to all cover elements of the device according to the invention. Thereby, the transfer occurs preferred angled with an angular offset, which is adapted to the angled assembly of the cover elements. In order to reliably close the slits in the closed position, the cover elements can comprise cover means, which are configured impermeable to air and/or massive, for example as flaps, wings, blades and/or as a roller blind. Further, the cover means can be partially permeable for air in order to always ensure a certain supply of radiator air. The angled transfer of the (drive) movement enables a simple and cost efficient production of the device according to the invention which is adjusted to the geometry of the cover elements or the vehicle (particularly the Fahrzeugpfeilung)

Advantageously, within the scope of the present invention it can be intended that the transfer of the movement by the driver can occur angled, wherein particularly the cover elements are arranged via an angle α angled towards one another, wherein the transfer of the movement by the driver occurs in the angle α between the cover elements. Therewith an optimal and efficient transfer of the movement by the driver is achieved. The driver can therefor for example comprise a base body, which for example is arranged parallel to the radiator grill or the slits or the center bar. Further, the driver can comprise at least one mounting element for each of the at least two cover elements, wherein the mounting element is assembled angled to the base body, particularly with an angle β, at the driver. The driver (meaning the base body with the mounting elements) can preferably be configured in one piece or monolithic (particularly from one material). The movement of the driver can for example be an arch-like movement in a circular arch, which is transferred to the cover elements in a way, that rotation, particularly a tilting movement of the cover element, occurs. Thereby particularly a first cover element is angled via the angle α to a second cover element. Preferably, all first cover elements are assembled parallelly to one another and/or one below the other and all second cover elements are assembled parallel towards one another and/or below one another in the device according to the invention.

Further, it is possible that the driver is configured such that the movement, particularly a rotating movement of the drive, is transferred by the driver with an angle offset at the at least two cover elements. The movement can particularly be a turning movement of the drive and particularly be transferred into an arch-like movement at the cover elements. It can be possible that the movement is transferred to the at least two cover elements only by the driver. Therewith, only the driver and/or the driver with a further (particularly single) connecting element is the connecting piece between the drive and the cover elements, such that by a removal of the driver a movement of all cover elements in a movement of the drive is prevented. This has the advantage that to a complicated transmission mechanism between the drive and the single cover elements can be resigned. Preferably the angle between the cover elements, meaning the longitudinal axis of the cover elements and the normal of the drive direction, is mainly the angle offset of the mounting element of the driver, meaning the angle β. Therewith the angle offset or the angle β preferably mainly corresponds to half of the angle α.

Advantageously, within the scope of the invention it can be intended that the driver comprises at least one mounting element, particularly a mounting pin, for the connection with the cover elements and particularly at least a second mounting element, particularly a mounting pin, for the connection with the drive. Thereby the second mounting element serves for the indirect connection with the drive. Thus, for example the connection of the driver with the drive via the connecting element, for example a crank, can occur. The first mounting element and the second mounting element are particularly arranged towards one another with an angle offset (for example with the angle β), which is adapted to the angle α. A connection of the first mounting element with the cover elements and/or the second mounting element with the connecting element occur preferably by clips and/or latching connection and/or via a joint and/or form- and/or force-fittingly. This ensures a reliable and secure transfer of the movement to the cover elements.

Preferably within the scope of the present invention it can be intended, that the driver is configured as a joint, particularly as a cardan joint or cross joint. Particularly, it can be intended, that each cover element is connected with a joint with the driver respectively. The cover element can for example be configured as a roller blind and can comprise a shaft for winding the roller blind, to which a turning movement of the drive is transferred by the driver. The transfer of the movement occurs particularly only via the driver. Thereby, the bending angle of the cardan joint or the cross joint corresponds to the angle offset or the angle β and can be adapted to the angle between the first cover element and the second cover element. Therewith a cost-efficient configuration of the driver for the reliable transfer of the movement is possible.

Preferably within the scope of the invention it can be intended, that the force flow for the transfer of the movement for moving the cover element between the closed position and the open position of the drive, occurs particularly only via the driver to the cover elements. Hereby the advantage is achieved, that the force flow for the movement of the cover elements between the closed position and the open position can occur reliably and efficiently via the angle offset, which is adapted to the angled arrangement of the cover element. The driver can herefore be connected directly and/or indirectly with the drive, for example via at least one connecting element (particularly in form of a handle). Thereby at least one, preferably two, connecting elements are connected with the drive shaft and/or drive recess of the drive, for example rotation-steady, such that with the operation of the drive a rotation movement of the connecting element(s) occurs. Since the respective connecting element is connected with the driver particularly irresolvable and/or form- and/or force-fittingly, the movement of the drive or the connecting element is transferred to the driver and the connecting element therewith guides the driver, particularly an at least partially arch-like movement. The driver again is connected with the cover elements, particularly all cover elements, form-fittingly and/or force-fittingly and thereby guides the cover elements in a rotational movement. Thereby the transfer of the movement preferably only from the drive occurs to the driver (via the at least one, preferably two, connecting elements) and therewith not from the cover element to the driver or from the drive to the cover element.

Preferably within the scope of the invention it can be intended, that at least a component within the force flow, particularly a driver and/or the first and/or the second mounting element of the driver, comprises a spherical and/or curved and/or angled surface, which is particularly configured in a way, that tolerances during a rotational movement, particularly of the cover elements, the mounting elements and/or the driver are balanced. Due to an angled assembly of the cover elements a movement, particularly of the cover elements, occurs without adjustment, for example not in a single layer, wherein here one speaks about a tolerance of the rotational movement. Hereby the advantage is achieved, that by a corresponding configuration of the component within the force flow an adjustment of this tolerance can occur.

Advantageously, within the scope of the present invention it can be intended, that the cover elements are movably mounted in a support, particularly rotatable, wherein particularly at least two bearing elements of the cover elements are mounted respectively in a bearing recess, particularly a swivel recess, of the carrier, meaning particularly tiltable about their longitudinal axis. Therewith the cover elements can be moved or turned (about their axial longitudinal- or turning axis) reliably between an open position and a closed position. Thereby in the closed position, particularly in the operating position, the cover means of the cover elements are arranged particularly parallel to the slit, such that the cover means can reliably, particularly completely close the slits. Starting from the closed position the cover elements can be turned into the (open) position by a turning movement, particularly a rotation about mainly 90°, in which the slits are released and an air entry through the opening between the cover means is possible. The bearing elements can be assembled at each cover element for the turnable bearing of the cover element, for example inside and/or outside and particularly can be configured in one piece and/or monolithic with the cover means. The bearing retainers are assembled correspondingly inside and/or outside at the carrier.

Preferably, it can be intended, that at least a central mounting element of the cover elements is assembled centrally at at least one cover means of the cover elements and particularly as the cover element is configured for a support element of the carrier. The at least one support element of the carrier is thereby assembled at the cover element such that particularly at the rear side of the device according to the invention, such that during an air entry the support element counteracts to the air contact pressure and therewith a bending or deformation of the cover elements, particularly the cover means, is prevented. Therewith, it can be ensured that likewise with high driving speed and correspondingly high contact pressures, provoked by incoming fresh air, a damage of the cover elements is prevented.

It is further possible, that the carrier and/or the cover elements and/or the driver are configured in one piece, particularly monolithic (from one material), particularly from a (plastic-) injection molding part and/or glass fiber reinforced. Hereby a cost-efficient production of the device according to the invention is enabled. Further, it is possible, that the carrier and/or the cover elements are producible in a two-component plastic injection molding method in one piece. Further, the carrier can enclose and store for example entirely the cover elements in the lateral area and/or in the upper and/or in the lower area of the device according to the invention. Likewise the carrier can comprise a center bar, which comprises bearing retainers for the cover elements. The center bar and/or the driver can further comprise at least one opening through which fresh air can enter for cooling the drive. Thereby, the drive can be assembled particularly directly behind the central bar of the carrier. Therewith, a safer and more reliable operation of the drive is ensured and an overheating is prevented.

Preferably within the scope of the invention it can be intended, that at least one or two connecting elements, particularly in form of a crank, can be connected for the direct connection and/or transfer of the movement of the drive, particularly a driving shaft and/or driving retainer, with the driver, particularly with a second mounting element. Hereby a movement of the driver in a partial circular path is enabled. A secure connection is for example achieved thereby that at least one connecting element is force- and/or form-fittingly with the (at least one) second mounting element for example are connected via a latching- and/or clipsing connection. The respective connecting element can thereby be mounted in the carrier or the center bar of the carrier movably and/or rotatably and comprise particularly a bearing pin for bearing. The carrier, particularly the center bar, comprises at least one corresponding bearing retainer for each bearing pin if necessary.

Advantageously, within the scope of the invention it can be intended, that the driver is connected via at least one first mounting element directly with the cover elements, particularly force- and/or form-fittingly with a receiving element of the cover elements, particularly in a way that during a movement of the driver a rotation of the cover elements between the open position and the closed position occurs. Hereby a reliable and safe transfer of the movement is enabled. Thereby it can be possible that at least two mounting elements, meaning a mounting element for each cover element, are intended. The connection between the mounting elements and the cover elements occurs particularly force- and/or form-fittingly via latching- and/or clipsing connection. Thereby the fastening elements of the driver are retained preferable rotatable in the corresponding retaining elements of the cover elements and guide the cover elements in a rotation movement.

The previously described drive can comprise a drive recess (for example a multi-tooth) preferably two drive recesses, which are intended for the forwarding of the drive movement directly at the driver or indirectly at the at least one connecting element. Ideally the two drive recesses are assembled axially opposing at the drive and can serve for a rotation-steady recess of the (two) connecting elements. The two connecting elements (particularly in form of a crank) are in turn connected with the driver respectively and transfer the introduced force/movement from the drive to the driver.

It is further possible that at least a fixation element of the driver is assembled at the first mounting element in a way that a lateral movement of the cover elements is blocked. Thereby the fixation element serves preferably as a stop for the receiving element of the cover element, such that an axial movement (meaning along the longitudinal axis of the cover elements) of the cover elements is limited and a safe connection and bearing between the driver and the cover elements is enabled. Further, thereby preferably at least two fixation elements can be intended, meaning one for each cover element or receiving element of the cover elements. The fixation elements enable preferably an axial guidance or bearing of the cover elements. The guidance of the cover elements by the driver occurs in a way that by the movement of the driver along a partially curved path a rotation of the cover elements about at least 10°, 30°, 45°, 60°, 75° or mainly 90° occurs.

Likewise, subject matter of the invention is a method for operating a device for regulating an airstream to a radiator device of the vehicle, particularly a motor vehicle, wherein the airstream is guided through the radiator device at at least one slit to with at least two cover elements, wherein the cover elements in a closed position at least partially close the slit and in an open position at least partially release the slit, wherein the movement of the cover elements between the closed position and the open position occurs by a drive, wherein the cover elements, particularly towards one another, are assembled angled and the movement of the drive to the cover elements is transferred particularly via a driver. Further, the device according to the invention can be operated with a method according to the invention. Thereby, the method according to the invention exhibits the same advantages like they are described in detail in relation to the device according to the invention.

Further, within the scope of the invention with the device according to the invention it is particularly a cool air regulation device for a vehicle, particularly a motor vehicle and/or passenger vehicle and/or commercial vehicle. Thereby the at least two cover elements can be particularly first and second cover elements. The movement can for example be a turning movement and/or a turning movement of the drive, which is generated with an operation of the drive. Thereby the drive can be preferably configured self-impeding and particularly comprise a worm gear, such that a turning movement of the cover elements is particularly only performable by the drive. Hereby the advantage is achieved that in the closed position an air pressure force to the cover elements or cover means of the cover elements does not lead to a turning movement of the cover elements (in an open position), since the movement by the (not operated) drive is blocked. The movement of the cover elements between an open position and a closed position is particularly a turning movement, particularly in an angle area between 0° (meaning that the cover element is assembled parallelly to the slit) and for example 20°, 45°, 70° and/or 90° (meaning that the cover means is turned in a way, that the slit is at least partially released and an air entry is possible). In the closed position the cover elements or cover means are particularly parallel to the normal of the drive direction. In at least an open position and/or in the 90°-position the cover elements or cover means are mainly parallel to the lower side of the vehicle. The rotation of the cover elements for movement between the open position and the closed position thereby occurs preferably about the longitudinal axis of the cover elements or cover means. By an operation of the drive a turning movement for example a driving shaft and/or driving recess of the drive is generated, wherein for example in the drive recess a driving shaft (via a multi-tooth) of a connecting element is arranged (rotation-steady) aligned (particularly on one axis). The connecting element is thereby pivotably supported in the carrier by at least one, particularly two, bearing means and rotation-steady connected with the drive or the drive recess. Accordingly, the operation of the drive effects a rotation of the connecting element, wherein the movement of the connecting element is transferred to the driver. Herefore the driver is connected with a connecting element, such that particularly an arch-like movement of the driver is affected. The driver is particularly assembled on the side opposing to the driving shaft of the connecting element, for example at the crank arm (which is assembled in the drive recess of the drive). The movement of the driver is further transferred particularly to all cover elements, wherein the cover elements are connected with the driver particularly via an angle offset.

Further, advantages, features and details of the invention result from the subsequent description, in which in relation to the drawings embodiments of the invention are described in detail. Thereby the features described in the claims and in the description can be essential for the invention each single for themselves or in any combination.

DETAILED DESCRIPTION

Figure 1A:
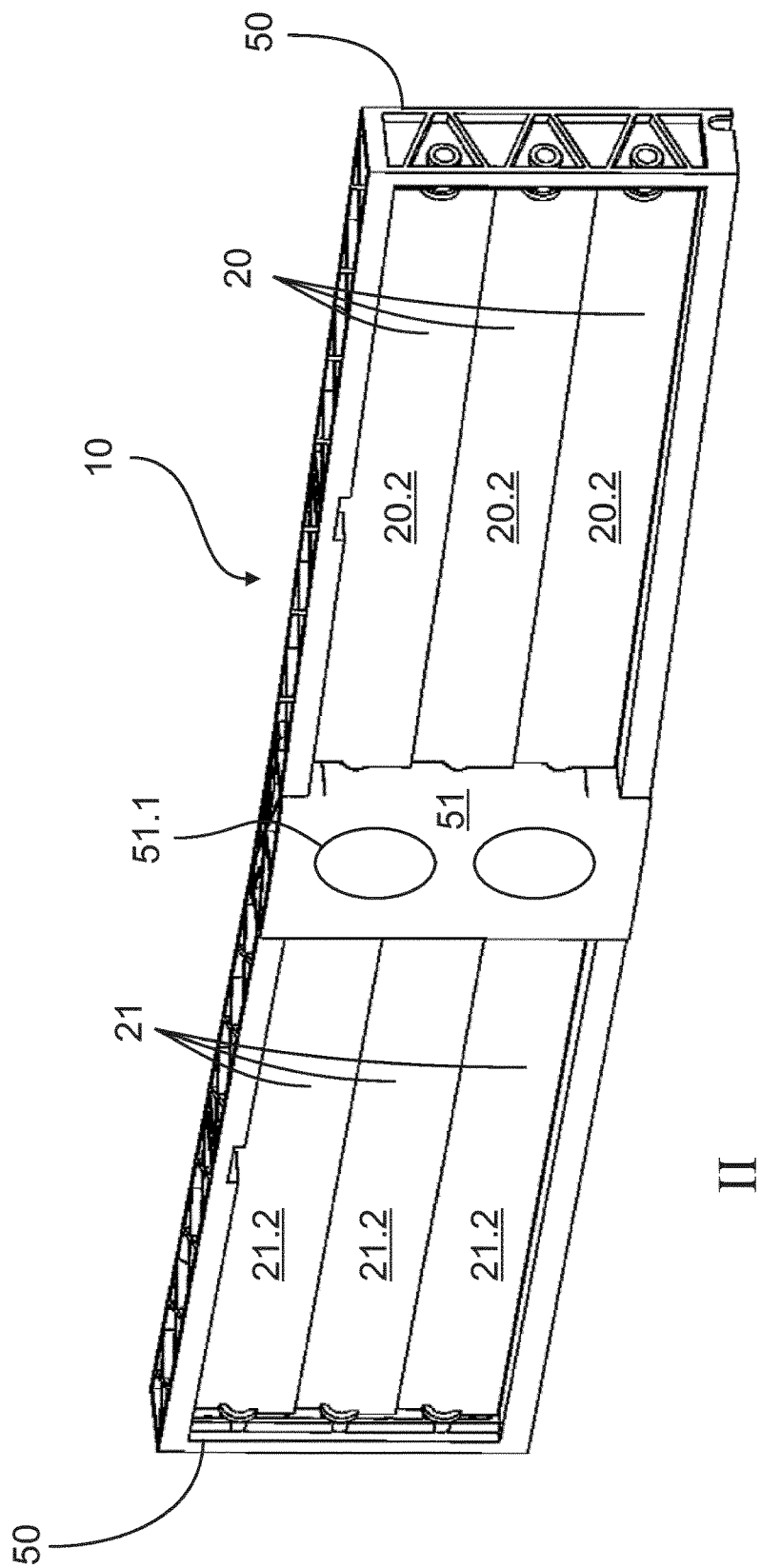
FIG. 1a a frontal view of the device according to the invention in a closed position, FIG. 1b a further frontal view of the device according to the invention in an open position, FIG. 2a a top view of the device according to the invention, FIG. 2b a schematic top view of the device according to the invention for the illustration of the geometry, FIG. 3 a perspective rear view of the device according to the invention, FIG. 4 a further perspective rear view of the device according to the invention, FIG. 5 a perspective frontal view of parts of the device according to the invention, FIG. 6 a top view of parts of the device according to the invention, FIG. 7a a schematic rear view of the device according to the invention in an open position, FIG. 7b a schematic rear view of the device according to the invention in a closed position, FIG. 8 a schematic representation for visualizing the method steps of the method according to the invention.
Figure 1B:
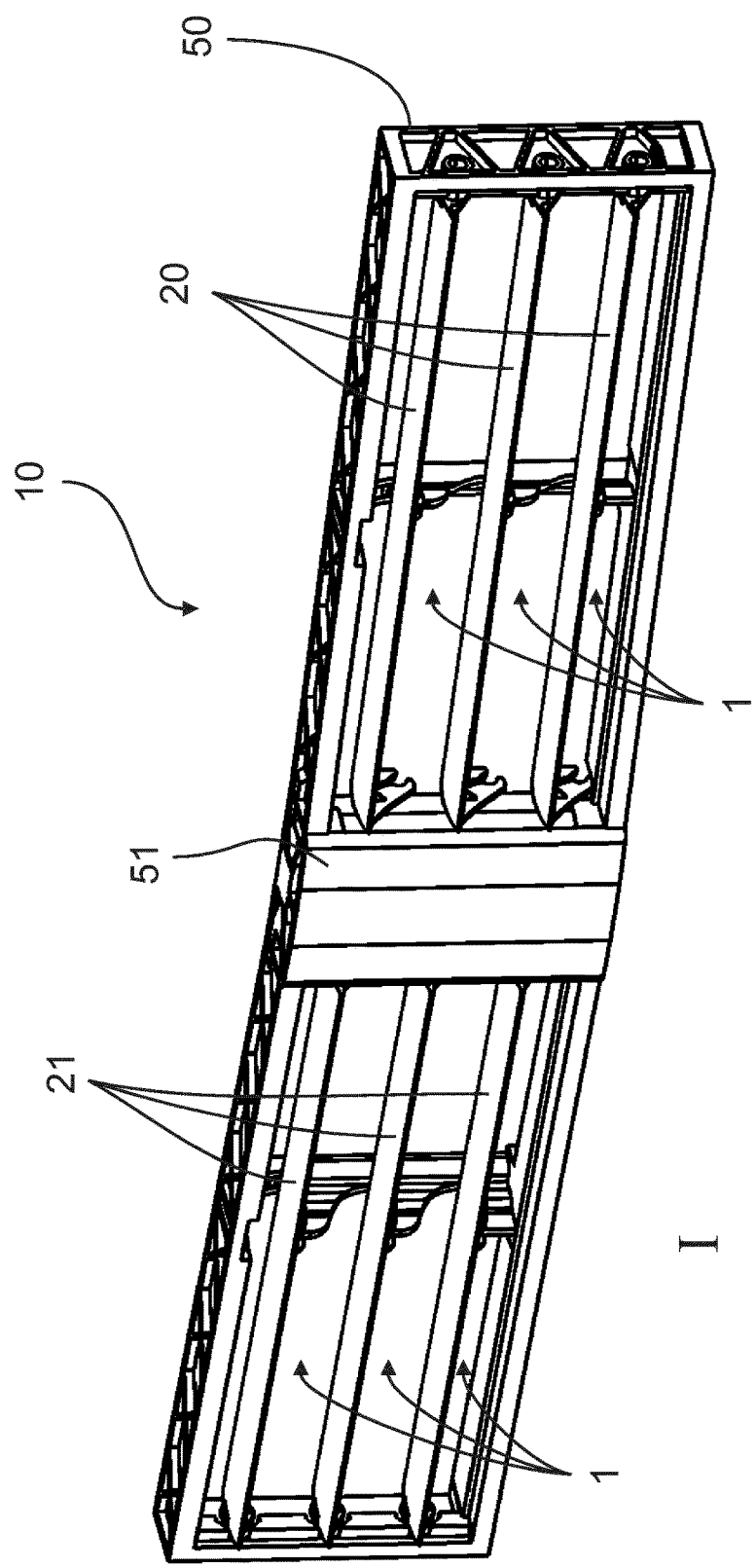

The FIGS. 1a and 1b show a frontal view of a device 10 according to the invention, wherein in FIG. 1a a closed position II is shown. Thereby it can be recognized, that in the closed position II cover elements 20, 21 are closed and therewith the air entry through an opening 1 is at least partially avoided by the cover elements 20, 21. The opening 1 can for example comprise the intermediate spaces of the device 10, which are shown for example in the open position I in FIG. 1b, such that with opened cover elements 20, 21 the airstream can be guided through the device 10. Likewise it is possible that an air entry area or a radiator grill of the vehicle directly in front of the device 10 according to the invention can be interpreted as an opening 1. Further, it is possible that the opening 1 comprises different opening areas, wherein to each opening area at least one (and in the whole embodiment three respectively) cover element/s 20, 21 is assigned. Thus, in FIG. 1a first cover elements 20 (on the left side in vehicle direction) and second cover elements 21 (on the right side in vehicle direction) are shown, wherein each cover element 20, 21 comprises cover means 20.2, 21.2. The cover means 20.2, 21.2 are air-impermeable and for example rigid, elastic or bendable, for example configured as blades, flaps or roller blinds, in order to affect an air-impermeable closing of the opening 1. All cover means 20.2, 21.2 or corresponding cover elements 20, 21 are assembled parallel to one another. The cover elements 20, 21 are rotatable in a carrier 50. Therewith the cover elements 20, 21 can be transferred from a closed position II, in which the cover means 20.2, 21.2 close the opening 1 or prevent the air entry into the vehicle by a turning movement in the carrier 50, into an open position I, in which the cover means 20.2, 21.2 are assembled or turned in a way, that the air entry through the opening 1 is enabled. The opening position I of the device 10 according to the invention is shown in FIG. 1b. In FIG. 1a further a center bar 51 is shown, which for example can be an integral part of the carrier 50, wherein behind the center bar 51 a drive 30 is arranged. Further, the center bar 51 can comprise at least one radiator slit 51.1 for the drive 30, in order to affect a sufficient cooling by fresh air, which is guided to the drive 30 via radiator slits 51.1 and therewith ensures a secure operation of the drive 30. The device 10 is assembled thereby for example in the frontal area of the vehicle, for example in the (rear) area of the front end module of the vehicle. The front side of the device 10 is aligned to the outside of the vehicle or to the front side of the vehicle, such that with an air entry through the device 10 the air is guided into the vehicle interior. The following directions of the device 10 thereby correspond with the vehicle directions (for example the frontal side of the device 10 is aligned in driving direction and the rear side to the vehicle interior). FIG. 1a also shows the location of radiator 60, disposed in the vehicle interior.

Figure 2A:
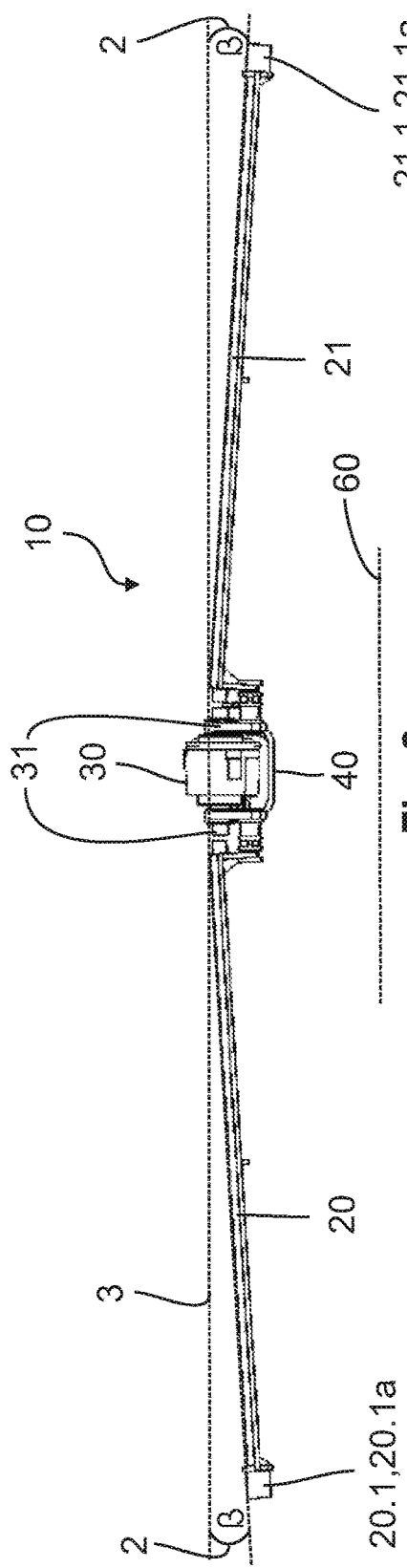
Figure 2B:
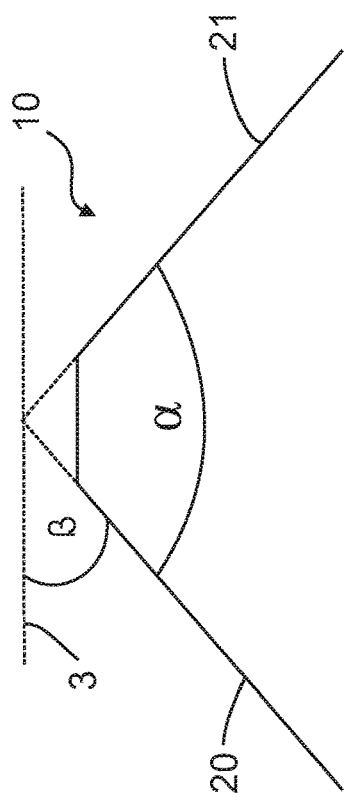

In FIG. 2a and FIG. 2b a top view of the device 10 according to the invention is shown, wherein first cover elements 20 are arranged on the left side of the device 10 or the vehicle and second cover elements 21 are arranged on the right side of the device 10 or the vehicle. The cover elements 20, 21 are connected centrally via a driver 40. The driver 40 is thereby at same time (indirectly) connected with the cover elements 20, 21 and with a drive 30 of the device 10 and assembled in a way that by the driver 40 a movement of the drive 30 (particularly a driving shaft or driving recess 30.1 of the drive 30) is transferable to the cover elements 20, 21. The driving recess 30.1 of the drive 30 aligns thereby with a driving shaft 31.2 of a connecting element 31 and is rotationally fixed with a connecting element 31. The connecting element 31 can for example be configured as a crank, for example via a latching or a clipsing connection form- and/or force-fittingly with a second, particularly inner, mounting element 40.2 of the driver 40. Hereby the second mounting element 40.2 can be configured as a mounting pin and can be rotatably supported form- and/or force-fittingly in the connecting element 31. Likewise in FIG. 2a it is shown that the cover elements 20, 21 are assembled angled towards one another, meaning particularly the first cover elements 20 are angled to the second cover elements 21. For alignment of the drive 30 (meaning the driving shaft or driving recess 30.1 of the drive 30) and/or to the normal of the drive direction 3, the cover elements 20, 21 (or the axis of rotation of the cover elements 20, 21 shown with a dashed line) better comprise a deflection angle 3. Accordingly, the cover elements 20, 21 are arranged angled towards one another via an angle α, wherein the angle α corresponds to the second fold of the angle 3. Thereby it is necessary, that the transfer of the movement of the drive 30 to the cover elements 20, 21 is angled, meaning it occurs with an angle offset 2. The angled arrangement of the cover element 20, 21 can be recognized in FIG. 2b. FIG. 2a also shows the location of radiator 60, disposed in the vehicle interior.

Figure 3:
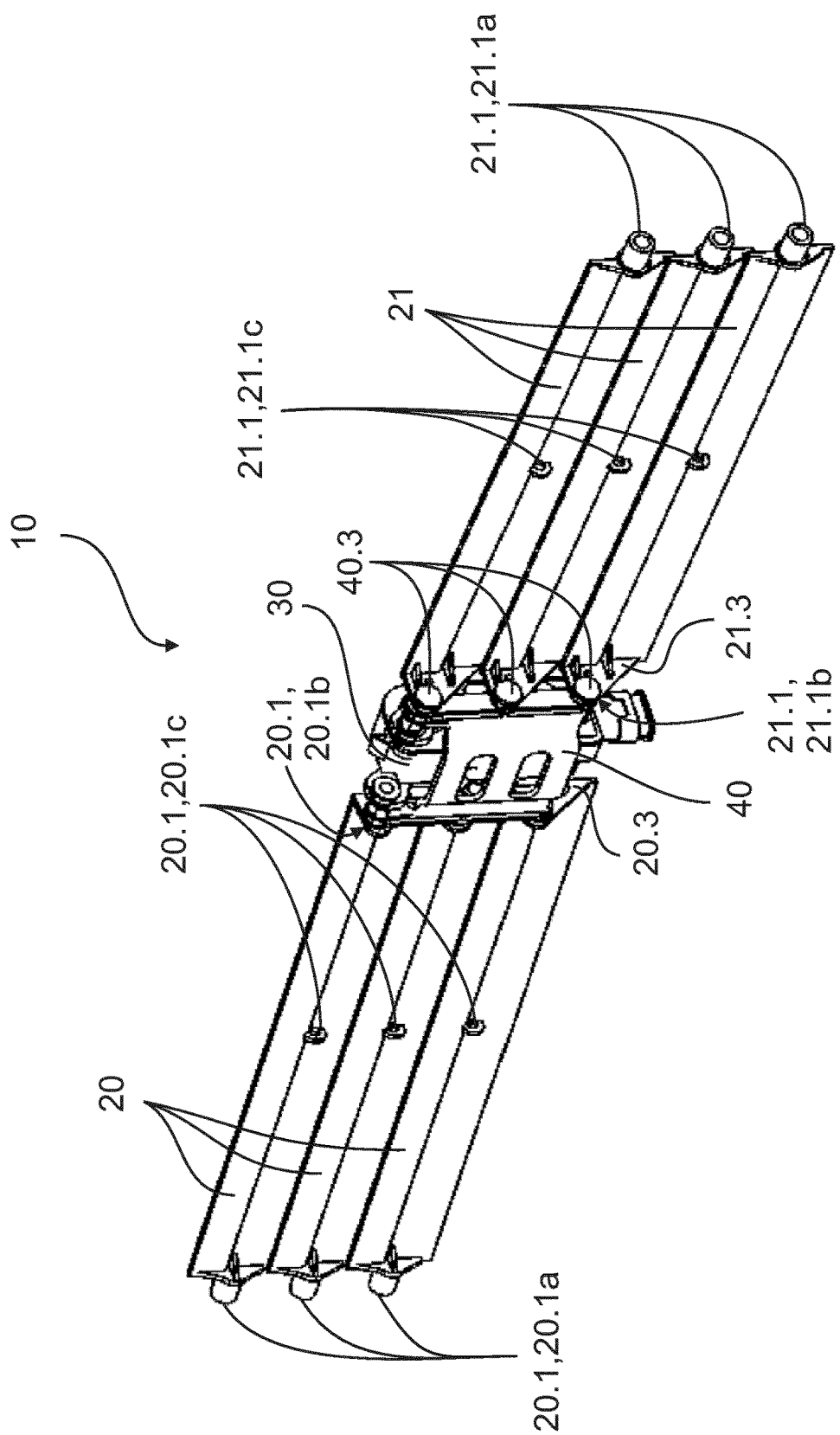

In FIG. 3 a perspective rear view of parts of the device 10 according to the invention is shown, wherein the carrier 50 is not shown. The device 10 according to the invention comprises thereby first cover elements 20 and second cover elements 21, wherein bearing elements 20.1 of the first cover elements 20 and bearing elements 21.1 of the second cover elements 21 are shown. Thereby it can be recognized that the driver 40 is on one side centrally connected with the first cover elements 20 (via receiving elements 20.3) and on the opposing side centrally with the cover elements 21 (via receiving elements 21.3). A movement of the driver 40, particularly along a (partial) circular path (for example in a plane parallel to the drive direction) is thereby transferred to the first cover elements 20 and also to the second cover elements 21 by the driver 40. Simultaneously, the first cover elements 21 are connected among each other via the driver 40 and the second cover elements 22 likewise are connected among each other via the driver 40. Since the cover elements 20, 21, particularly the cover means 20.2, 21.2, are pivotably mounted via bearing elements 20.1, 21.1 in the carrier 50, the movement of the driver 40 along the circular path is transferred into a pivoting movement of the cover elements 20, 21 in the carrier 50 (or each single cover means 20.2, 21.2). A single cover element 20, 21 therewith comprises a cover means 20.2, 21.2 and at least two bearing elements 20.1, 21.1 on opposing sides. For example, the single first cover element 20 comprises a first or outer bearing element 20.1a and a second, inner bearing element 20.1b on the opposing side of the cover means 20.2 of the cover element 20. The bearing elements 20.1, 21.1 comprise for example the outer bearing elements 20.1a, 21.1a, central bearing elements 20.1c, 21.1c and inner bearing elements 20.1b, 21.1b. The inner bearing elements 20.1b, 21.1b thereby serve for the connection and bearing at the inner bearing recess 50.1b of the carrier 50. For the connection and/or guidance of the cover elements 20, 21 at the driver 40 further receiving elements 20.3 are provided, wherein fixing elements 40.3 of the driver 40 for example are configured as mushroom heads and arranged in a way that a lateral movement (meaning towards the outside) of the cover elements 20, 21 away from the driver 40 is prevented. Further, behind the driver 40 a drive 30 is arranged, which generates a mechanic (turning-) movement, wherein the driver 40 is moved along and the cover elements 20, 21 are driven for a movement between the open position I and the closed position II. The driver 40 comprises radiator openings 40.5, in order to enable a cooling of the drive 30.

Figure 4:
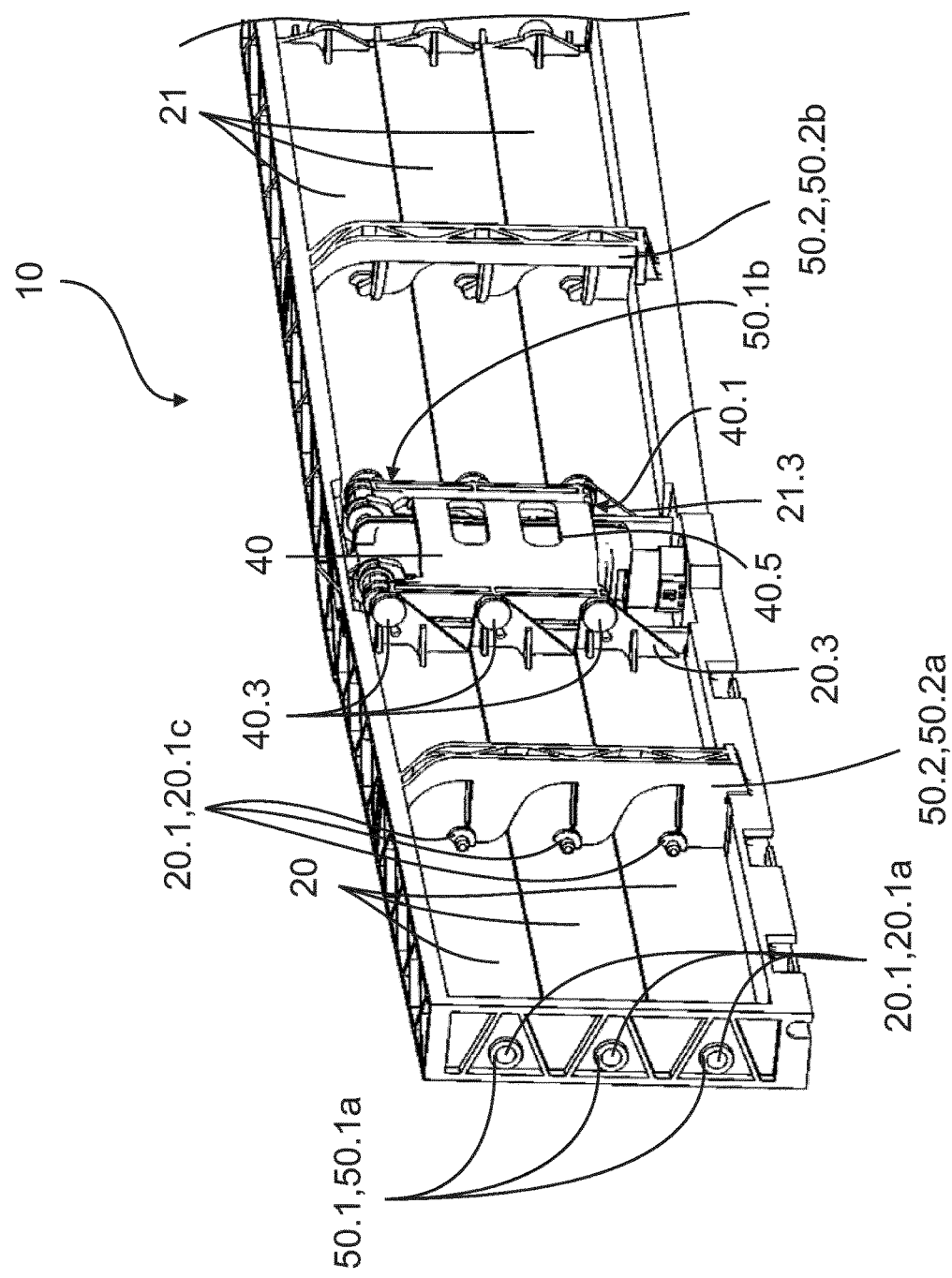

FIG. 4 shows an enlarged representation of the device 10 according to the invention in a rear view. The cover elements 20, 21, particularly the cover means 20.2, 21.2 are pivotably mounted in the carrier 50. Like already described, the cover elements 20, 21 comprise bearing elements 20.1, 21.1 connected to the cover means 20.2, 21.2. The bearing elements 20.1, 21.1 can thereby for example be configured as bearing pins and correspond to the respective bearing retainer 50.1 of the carrier 50. As it can be recognized in FIG. 4, thereby an outer bearing element 20.1a can be pivotably mounted and/or form-fittingly connected in an outer bearing recess 50.1a of the carrier 50. Accordingly, this applies for the outer bearing element 21.1a of the second cover elements 21 or cover means 21.2 and outer bearing recesses 50.1a of the carrier 50 on the opposing side of the carrier 50. Further, in FIG. 4 central bearing elements 20.1c, 21.1c of the cover elements 20, 21 are shown which are connected with the cover means 20.2, 21.2 and are for example configured as receiving elements for bearing of the bearing pin of the support elements 50.2. Thereby a first support element 50.2a and a second support element 50.2b can be intended for supporting first cover elements 20 and second cover elements 21 respectively and can be mounted through central bearing elements 20.1c, 21.1c of the cover elements 20, 21 respectively. The supporting elements 50.2 thereby enable an improved bearing of the cover elements 20, 21 in the carrier 50 and further prevent a bending of the cover elements 20, 21 and/or cover means 20.2, 21.2 with a high contact pressure through the air entry through the opening 1. Further, in FIG. 4 receiving elements 20.3, 21.3 of the cover elements 20, 21 are presented, which enable a force- and/or form-fitting acceptance and/or a pivotable bearing at first or outer mounting elements 40.1 of the driver 40. Fixing elements 40.3 of the driver 40 are thereby assembled in a way that a lateral movement (meaning towards the outside) of the cover elements 20, 21 or cover means 20.2, 21.2 away from the driver 40 is prevented.

Figure 5:
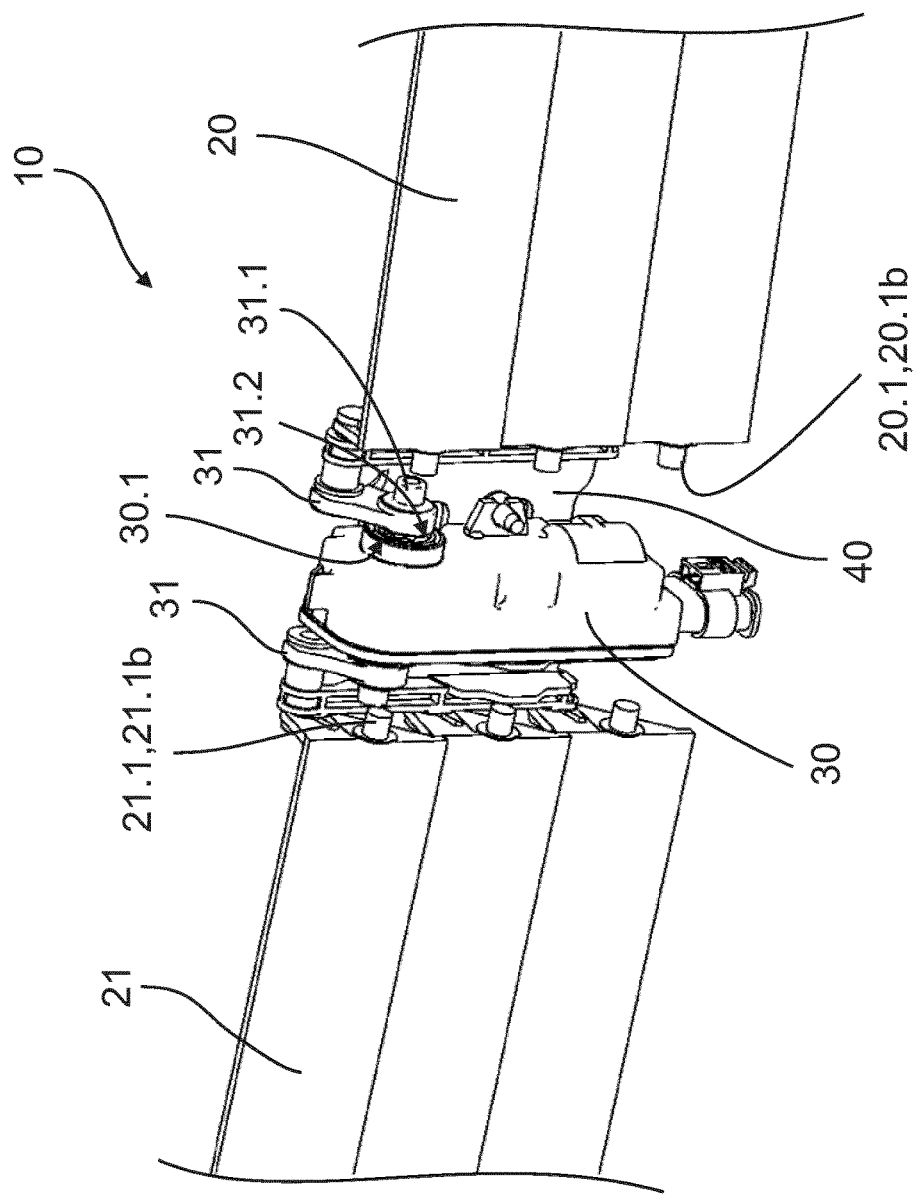

FIG. 5 shows an enlarged view of parts of device 10 according to the invention, particularly a drive 30 of a driver 40 and a connecting element 31. The drive 30 comprises a drive acceptance 30.1, in which a driving shaft 31.2 of the connecting element 31 is introduced.

The driving shaft 31.2 is for example rotationally fixed, form- and/or force-fittingly connected with the drive recess 30.1 or assembled in the drive recess 30.1. The drive 30 can for example be configured self-impending, such that a movement or turning movement of the connecting element 31 can only be effected by the drive 30. The driver 40 in turn is connected by a mounting element, particularly a second mounting element 40.2, with the connecting element 31 and therewith indirectly with the drive 30. The movement of the connecting element 31 by the drive 30 guides the driver 40 in a movement, particularly in a circular path. Since the driver 40 is connected via mounting elements, particularly first or outer mounting elements 40.1, with the cover elements 20, 21, the movement of the drive 30 is transferred to the cover elements 20, 21. The cover elements 20, 21 are pivotably mounted via bearing elements 20.1, 21.1 in the carrier 50, such that an operation of the drive 30 effects a turning of the cover elements 20, 21 in the carrier 50 and therewith a tilting of the cover means 20.2, 21.2 occurs, whereby an opening 1 is released. Thereby in FIG. 5 particularly the inner bearing elements 20.1b, 21.1b of the cover elements 20, 21 and the bearing means 31.1 of the connecting element 31 are shown. By the bearing elements 20.1b, 21.1b the bearing of the cover elements 20, 21 occurs in the carrier 50 or in a not shown center bar 51. The bearing means 31.1 are likewise pivotably mounted in the carrier 50 or in the center bar 51.

In FIG. 6 a top view on parts of the device 10 according to the invention is shown. Thereby a drive 30 is shown, wherein the connecting element 31 is operated by the drive 30. In the shown embodiment in FIG. 6 thereby the alignment of the drive 30 corresponds to the axis of the bearing means 31.1 of the connecting element 31. Further, it can be recognized, that a first cover element 20 is aligned in an angle β towards the alignment of drive 30 or the axis of the bearing means 31.1. The same applies for a second cover element 21. In order to enable an efficient transfer of the movement of the drive 30 to the cover elements 20, 21, the movement is transferred via a driver 40 angled via an angle offset 2. The angle offset 2 corresponds thereby mainly to the angle β. Hereby the driver 40 comprises a mounting element, particularly a second or inner mounting element 40.2, which is connected with a connecting element 31 or is pivotably mounted in the connecting element 31. The second (or inner) mounting element 40.2 is thereby mainly parallel towards the alignment of the drive 30 or of a drive recess 30.1 or the bearing means 31.1. Further, the driver 40 comprises a further mounting element, particularly a first or outer mounting element 40.1, which is connected with the cover elements 20, 21 or pivotably mounted in the cover elements 20, 21 (meaning in at least one receiving element 20.3, 21.3 of the cover elements 20, 21). The first (or outer) mounting element 40.1 is thereby configured rigid and/or rotationally fixed with the second or inner mounting element 40.2, such that a movement of the driver 40 relates at the same time to the second (inner) mounting element 40.2 and also to the first (outer) mounting element 40.1. The second mounting element 40.2 thereby comprises an alignment, which is adjusted to the alignment of the cover elements 20, 21 and corresponds mainly to the angle offset 2.

Figure 7A:
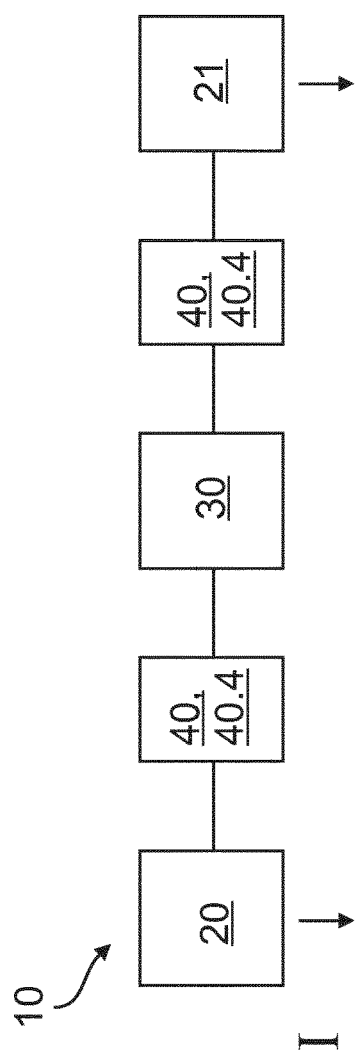
Figure 7B:
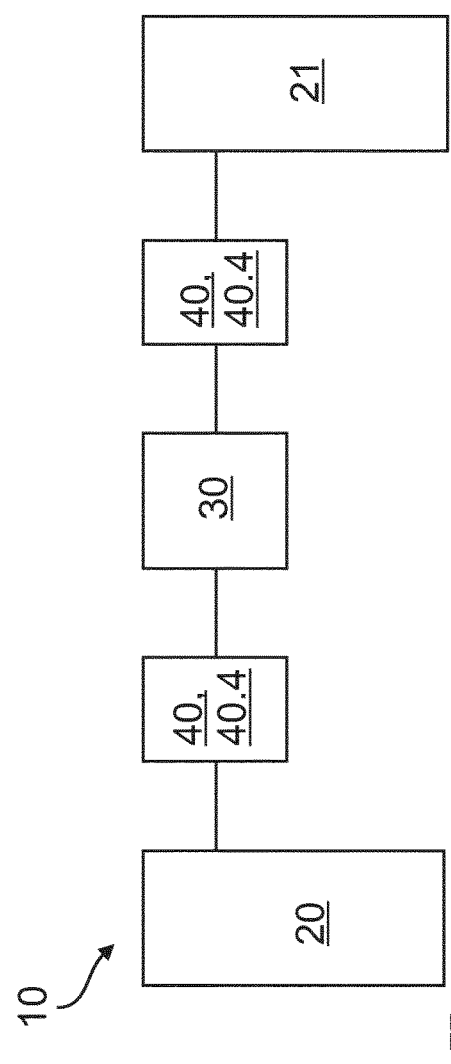

FIG. 7a and FIG. 7b show a schematic rear view of the device 10 according to the invention, wherein in FIG. 7a an open position I and in FIG. 7b a closed position II is shown. It can be recognized that a drive 30 is assembled centrally between a first cover element 20 and a second cover element 21. The cover elements 20, 21 can thereby be configured for example as a roller blind. In the open position I thereby the cover elements 20, 21 are wound up and can be transferred into the closed position II by unwinding. This is achieved by a movement of the drive 30, which for example transfers a pivotable movement via a driver 40 to a shaft (for winding of the roller blind) of the cover elements 20, 21. A turning in the first direction therewith effects a winding up and a turning in a second direction an unwinding of the cover means 20.2, 21.2, which for example comprise an elastic material or a textile. In order to enable a reliable transfer, particularly of an angled transfer with an angle offset 2, thereby a driver 40 is configured as a joint 40.4, particularly as a cardan joint.

Figure 8:
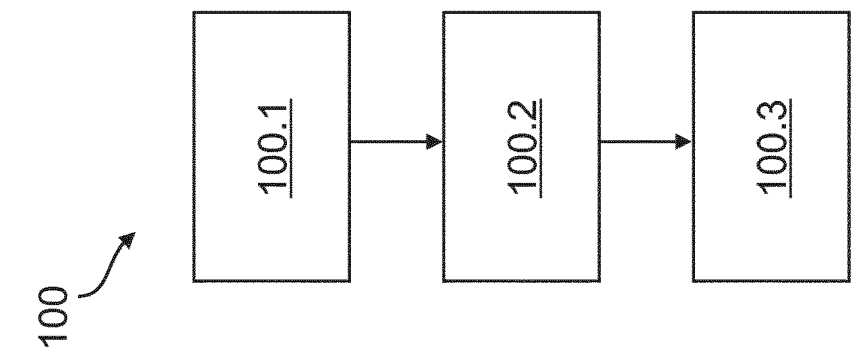

In FIG. 8 a schematic method 100 according to the invention is shown, wherein in a first method step 100.1 the cover elements 20, 21 are in an open position I. Subsequently, in a second method step 100.2 a movement of the drive 30 via a driver 40 is transferred angled to the cover elements 20, 21. After a movement of the driver 40 along a circular path the cover elements 20, 21 are in a closed position II in the third method step 100.3, wherein here the air entry through the opening 1 is at least partially prevented.

The previous description of the embodiments describes the present invention only within the scope of examples. Naturally single features of the embodiments, as far as technically meaningful, can be freely combined with one another, without leaving the scope of the present invention.

REFERENCE LIST

1 Opening
2 Angular offset
3 Normal to the driving direction
10 Device, cool air control device
20 Cover element, first cover element
20.1 Bearing element, bearing pin
20.1a Outer bearing element
20.1b Inner bearing element
20.1c Central bearing element
20.2 Cover means, flaps, blades
20.3 Receiving element for 40.1
21 Cover element, second cover element
21.1 Bearing element, bearing pin
21.1a Outer bearing element
21.1b Inner bearing element
21.1c Central bearing element
21.2 Cover mean, flaps, blades
21.3 Receiving element for 40.1
30 Drive
30.1 Driving recess
31 Connecting element, crank
31.1 Bearing means
31.2 Drive shaft
40 Driver 40.1 First mounting element, mounting pin
40.2 Second mounting element, mounting pin
40.3 Fixing element for 40.1, mushroom head
40.4 Joint
40.5 Radiator slit for 30
50 Carrier
50.1 Bearing retainer
50.1a Outer bearing retainer
50.1b Inner bearing retainer
50.2 Support element
50.2a First support element
50.2b Second support element
51 Center bar
51.1 Radiator slit for 30
100 Method
100.1 First method step
100.2 Second method step
100.3 Third method step
I Open position
II Closed position
α Angle
β Angle

The invention claimed is:

1. A device for regulating an airstream to a radiator device of a vehicle, wherein the airstream is guidable through at least one opening to the radiator device, comprising:
at least two cover elements for at least partially closing the opening in at least a closed position;
a drive for moving the cover elements between the closed position and an open position for the at least partial release of the opening; and
a driver disposed upstream of the drive, the driver coupled to the drive and the at least two cover elements and configured transfer of a movement of the drive to the at least two cover elements, and the driver having at least one opening to enable cooling of the drive; and
wherein:
the at least two cover elements are arranged angled towards one another; and
the drive and driver are positioned between the at least two cover elements.

2. The device according to claim 1, wherein the transfer of the movement of the driver occurs angled, wherein the cover elements are assembled angled towards one another via an angle α, and wherein the transfer of the movement via the driver of the angle α occurs between the cover elements.

3. The device according to claim 1, wherein the driver is configured in a way, that the movement of the drive is transferred via the driver with an angle offset of at the at least two cover elements.

4. The device according to claim 1, wherein the driver comprises at least a first mounting element for connection with the cover elements and at least a second mounting element for connection with the drive.

5. The device according to claim 1, wherein the driver is configured as a joint.

6. The device according to claim 1, wherein the transfer of the movement of the cover elements between the closed position and the open position from the drive occurs via the driver to the cover elements.

7. The device according to claim 1, wherein the cover elements are movably embedded in a carrier, and wherein at least two bearing elements of the cover elements are pivotably embedded in a bearing recess of the carrier respectively.

8. The device according to claim 7, wherein at least one central bearing element of the cover elements is arranged centrally at at least a cover means of the cover elements, and is configured as a receiving element for a supporting element of the carrier.

9. The device according to claim 1, further comprising a connecting element for the direct connection and/or transfer of the movement of the drive.

10. The device according to claim 1, wherein the driver is directly connected to the cover elements by at least one first mounting element, such that during a movement of the driver a rotation of the cover elements occurs between the open position and the closed position.

11. The device according to claim 10, further comprising at least one fixing element of the driver assembled at the first mounting element such that a lateral movement of the cover elements is blocked.

12. A method for operation of a device for regulation an airstream to a radiator device of a vehicle, wherein the airstream is guided through at least one opening to the radiator device with at least two cover elements, wherein the cover elements in at least one closed position at least partially close the opening and in an open position at least partially release the opening, comprising moving the cover elements between the closed position and the open position via a drive, wherein the cover elements are assembled angled and the movement of the drive is transferred to the cover elements via a driver, wherein the driver is disposed upstream of the drive, and wherein the drive and the driver are positioned between the at least two cover elements.

* * * * *